(12) United States Patent
Lee et al.

(10) Patent No.: US 7,262,826 B2
(45) Date of Patent: Aug. 28, 2007

(54) LIQUID CRYSTAL DEVICE WITH PROCESS MARGINS FOR STITCHING SPOTS

(75) Inventors: Su Woong Lee, Kyongsangbuk-do (KR); Sang Yoon Paik, Seoul (KR)

(73) Assignee: LG. Philips LCD. Co., Ltd., Seoul (KR)

( * ) Notice: Subject to any disclaimer, the term of this patent is extended or adjusted under 35 U.S.C. 154(b) by 130 days.

(21) Appl. No.: 10/879,196

(22) Filed: Jun. 30, 2004

(65) Prior Publication Data

US 2005/0094063 A1    May 5, 2005

(30) Foreign Application Priority Data

Oct. 31, 2003    (KR) ..................... 10-2003-0076805

(51) Int. Cl.
  *G02F 1/1343*    (2006.01)
  *G02F 1/1333*    (2006.01)
  *G02F 1/1337*    (2006.01)
(52) U.S. Cl. ..................... 349/141; 349/110; 349/129
(58) Field of Classification Search ................ 349/141, 349/129, 110–111
See application file for complete search history.

(56) References Cited

U.S. PATENT DOCUMENTS 6,297,866 B1 * 10/2001 Seo et al. ................... 349/141
6,459,465 B1 * 10/2002 Lee ............................. 349/141
6,507,383 B1 *  1/2003 Abe et al. .................... 349/141
6,538,713 B1 *  3/2003 Yanagawa et al. .......... 349/146
6,650,388 B2 * 11/2003 Ohta et al. .................. 349/139
2002/0047973 A1 *  4/2002 Matsumoto ................. 349/141
2004/0252266 A1 * 12/2004 Shimizu et al. ............. 349/139

FOREIGN PATENT DOCUMENTS

KR    2000-0071676 A    11/2000

* cited by examiner

*Primary Examiner*—Mike Qi
(74) *Attorney, Agent, or Firm*—Birch, Stewart, Kolasch & Birch, LLP

(57) ABSTRACT

A liquid crystal display (LCD) device is disclosed which defines an open area of a lower substrate by a common electrode, for preventing stitching spots and changes of the aperture ratio by the bonding process on a large-sized LCD panel, which includes first and second substrates facing each other at a predetermined interval therebetween; gate and data lines crossing each other on the first substrate to define a pixel region; a common line in parallel to the gate line; a thin film transistor at a crossing portion of the gate and data lines; a plurality of common electrodes connected to the common line at fixed intervals in the same direction as the data line; a pixel electrode in contact with a drain electrode of the thin film transistor, between the common electrodes at fixed intervals; a black matrix layer provided on the second substrate, inside the outermost-opening limiting line of the first substrate (below the bonding margin); and a color filter layer provided on the second substrate.

16 Claims, 8 Drawing Sheets

LIQUID CRYSTAL DEVICE WITH PROCESS MARGINS FOR STITCHING SPOTS

This application claims the benefit of the Korean Application No. P2003-76805 filed on Oct. 31, 2003, the subject matter of which is hereby incorporated by reference.

BACKGROUND OF THE INVENTION

1. Field of the Invention

The present invention relates to a liquid crystal display (LCD) device, and more particularly, to a liquid crystal display (LCD) device, to obtain the process margin for stitching spots on a large-sized LCD panel, for improving yield.

2. Discussion of the Related Art

Demands for various display devices have increased with the development of an information society. Accordingly, many efforts have been made to develop various flat display devices such as liquid crystal displays (LCD), plasma display panels (PDP), electroluminescent displays (ELD), and vacuum fluorescent displays (VFD). Some species of flat display devices have already been applied to displays for various devices.

Among the various flat display devices, the liquid crystal display (LCD) devices have been most widely used due to the advantageous characteristics of thin profile, lightness in weight, and low power consumption, whereby the LCD devices provide a substitute for Cathode Ray Tubes (CRT). In addition to mobile type LCD devices such as a display for a notebook computer, LCD devices have been developed for computer monitors and televisions for receiving and displaying broadcasting signals.

Despite various technical developments in the LCD technology for finding applications in different fields, research in enhancing the picture quality of the LCD device has been, in some respects, lacking as compared to other features and advantages of the LCD device. In order to use LCD devices in various fields as a general display, the key to developing LCD devices depends on whether LCD devices can implement a high quality picture, such as high resolution and high luminance with a large-sized screen, while still maintaining lightness in weight, thin profile, and low power consumption.

A general LCD device includes an LCD panel for displaying a picture image, and a driving element for applying a driving signal to the LCD panel. The LCD panel includes first and second glass substrates being bonded to each other with a predetermined interval therebetween, and a liquid crystal layer injected between the first and second glass substrates. The first glass substrate (TFT array substrate) includes a plurality of gate and data lines, a plurality of pixel electrodes, and a plurality of thin film transistors. At this time, the plurality of gate lines are formed on the first glass substrate at fixed intervals, and the plurality of data lines are formed in perpendicular to the plurality of gate lines at fixed intervals. Then, the plurality of pixel electrodes, arranged in a matrix-type configuration, are respectively formed in pixel regions defined by the plurality of gate and data lines crossing each other. The plurality of thin film transistors are switched according to signals of the gate lines for transmitting signals of the data lines to the respective pixel electrodes. The second glass substrate (color filter substrate) includes a black matrix layer that excludes light from regions except the pixel regions of the first substrate, an R/G/B color filter layer displaying various colors, and a common electrode for obtaining the picture image. In the case of an In-Plane Switching (IPS) mode LCD device, the common electrode is formed on the first glass substrate.

Next, a predetermined space is maintained between the first and second glass substrates by spacers, and the first and second substrates are bonded to each other by a seal pattern having a liquid crystal injection inlet. At this time, the liquid crystal layer is formed according to a liquid crystal injection method, in which the liquid crystal injection inlet is dipped into a vessel containing the liquid crystal while maintaining a vacuum state in the predetermined space between the first and second glass substrates. That is, the liquid crystal is injected between the first and second substrates by an osmotic action. Then, the liquid crystal injection inlet is sealed with a sealant.

The LCD device is driven according to the optical anisotropy and polarizability of the liquid crystal. Liquid crystal molecules are aligned using directional characteristics because the liquid crystal molecules each has long and thin shapes. In this respect, an induced electric field is applied to the liquid crystal for controlling the alignment direction of the liquid crystal molecules. That is, if the alignment direction of the liquid crystal molecules is controlled by the induced electric field, the light is polarized and changed by the optical anisotropy of the liquid crystal, thereby displaying the picture image. In this state, the liquid crystal is classified into a positive (+) type liquid crystal having a positive dielectric anisotropy and a negative (−) type liquid crystal having a negative dielectric anisotropy according to electrical characteristics of the liquid crystal. In the positive (+) type liquid crystal, the longitudinal (major) axis of a positive (+) liquid crystal molecule is disposed in parallel to the electric field applied to the liquid crystal. In the negative (−) type liquid crystal, the longitudinal (major) axis of a negative (−) liquid crystal molecule is disposed perpendicular to the electric field applied to the liquid crystal.

FIG. 1 is an exploded perspective view illustrating a general Twisted Nematic (TN) mode LCD device. As shown in FIG. 1, the TN mode LCD device includes a lower substrate 1 and an upper substrate 2 bonded to each other with a predetermined interval therebetween, and a liquid crystal layer 3 injected between the lower and upper substrates 1 and 2.

More specifically, the lower substrate 1 includes a plurality of gate lines 4, a plurality of data lines 5, a plurality of pixel electrodes 6, and a plurality of thin film transistors T. The plurality of gate lines 4 are formed on the lower substrate 1 in one direction at fixed intervals, and the plurality of data lines 5 are formed perpendicular to the plurality of gate lines 4 at fixed intervals, thereby defining a plurality of pixel regions P. The plurality of pixel electrodes 6 are respectively formed in the pixel regions P defined by the plurality of gate and data lines 4 and 5 crossing each other, and the plurality of thin film transistors T are respectively formed at crossing portions of the plurality of gate and data lines 4 and 5. Next, the upper substrate 2 includes a black matrix layer 7 that excludes light from regions except the pixel regions P, R/G/B color filter layers 8 for displaying various colors, and a common electrode 9 for displaying a picture image.

At this time, the thin film transistor T includes a gate electrode, a gate insulating layer (not shown), an active layer, a source electrode, and a drain electrode. The gate electrode projects from the gate line 4, and the gate insulating layer (not shown) is formed on an entire surface of the lower substrate. Then, the active layer is formed on the gate insulating layer above the gate electrode. The source electrode projects from the data line 5, and the drain electrode is formed opposite to the source electrode. Also, the aforementioned pixel electrode 6 is formed of a transparent conductive metal having great transmittance, such as indium-tin-oxide (ITO).

In the aforementioned LCD device, liquid crystal molecules of the liquid crystal layer 3 on the pixel electrode 6 are aligned with a signal applied from the thin film transistor T, and light transmittance is controlled according to the alignment of the liquid crystal, thereby displaying the picture image. In this state, an LCD panel drives the liquid crystal molecules by an electric field provided perpendicular to the lower and upper substrates. This method obtains great transmittance and a high aperture ratio. Also, it is possible to prevent liquid crystal cells from being damaged by static electricity since the common electrode 9 of the upper substrate 2 serves as the ground. However, in the case of driving the liquid crystal molecules by the electric field perpendicular to the lower and upper substrates, it is difficult to obtain a wide viewing angle.

In order to overcome these problems, an In-Plane Switching (IPS) mode LCD device has been recently proposed. Hereinafter, the related art IPS mode LCD device will be described with reference to the accompanying drawings. FIG. 2 is a cross-sectional view schematically illustrating the related art IPS mode LCD device. In the related art IPS mode LCD device, as shown in FIG. 2, a common electrode 13 and a pixel electrode 12 are formed in the same plane of a lower substrate 11. Then, the lower substrate 11 is bonded to an upper substrate 15 at a predetermined interval therebetween, and liquid crystal 14 is formed between the lower and upper substrates 11 and 15. The liquid crystal 14 is driven by an electric field formed between the common electrode 13 and the pixel electrode 12 on the lower substrate 11.

FIG. 3A and FIG. 3B illustrate the alignment direction of the liquid crystal when a voltage is turned on/off in the related art IPS mode LCD device.

FIG. 3A illustrates the related art IPS mode LCD device when the voltage is turned off. That is, an electric field parallel to the lower and upper substrates is not applied to the common electrode 13 or the pixel electrode 12. Accordingly, there is no change in alignment of the liquid crystal 14. For example, liquid crystal molecules are basically twisted at 45° to a horizontal direction of the pixel electrode 12 and the common electrode 13.

FIG. 3B illustrates the related art IPS mode LCD device when the voltage is turned on. That is, the electric field parallel to the lower and upper substrates is applied to the common electrode 13 and the pixel electrode 12, thereby changing the alignment of the liquid crystal 14. In more detail, the alignment of liquid crystal 14 is twisted more than 45° as compared to the alignment of the liquid crystal when the voltage is turned off. In this state, the horizontal direction of the common and pixel electrodes 13 and 12 is identical to the twisted direction of liquid crystal.

As mentioned above, the related art IPS mode LCD device has the common electrode 13 and the pixel electrode 12 on the same plane. Thus, it has advantageous characteristics such as a wide viewing angle. For example, along a front direction of the IPS mode LCD device, a viewer can have a viewing angle of 70° in all directions (i.e., lower, upper, left, and right directions). Furthermore, the related art IPS mode LCD device has simplified fabrication process steps, and reduced color shift. However, the related art IPS mode LCD device has the problems of low light transmittance and low aperture ratio since the common electrode 13 and the pixel electrode 12 are formed on the same substrate.

Also, it is required to improve the response time by the driving voltage, and to maintain the uniform cell gap due to the small misalign margin of cell gap. That is, the IPS mode LCD device has the aforementioned advantages and disadvantages, whereby a user can select the mode of the LCD device according to the desired purpose.

FIG. 4A and FIG. 4B are perspective views illustrating an operation of the IPS mode LCD device on the turning on/off state. Referring to FIG. 4A, when a voltage is not supplied to the pixel electrode 12 or the common electrode 13, the alignment direction 16 of the liquid crystal molecules is identical to the alignment direction of an initial alignment layer (not shown). However, as shown in FIG. 4B, when the voltage parallel to substrates is supplied to the pixel electrode 12 and the common electrode 13, the alignment direction 16 of the liquid crystal molecules corresponds to the electric field application direction 17.

Hereinafter, a related art LCD device will be described with reference to the accompanying drawings.

FIG. 5 is a plane view illustrating a related art IPS mode LCD device. As shown in FIG. 5, the related art IPS mode LCD device includes a transparent lower substrate (not shown). The transparent lower substrate includes a plurality of gate lines 21 formed in one direction at fixed intervals, and a plurality of data lines 23 disposed perpendicular to the gate lines 21 at fixed intervals, to define a plurality of pixel regions. Also, a common line 21a is formed in the pixel region on the same plane as the gate line 21 in parallel, and a plurality of common electrodes 21b connected to the common line 21a are formed at fixed intervals in the same direction as the data line 23. At this time, the common electrodes 21b are formed in a zigzag pattern.

A plurality of thin film transistors are formed at respective crossing portions of the plurality of gate and data lines 21 and 23. The adjacent upper and lower pixel regions use the gate line 21 in common. Also, the two thin film transistors of the adjacent pixel regions use gate and source electrodes in common. The adjacent two thin film transistors include a gate electrode defined in one portion of the gate line 21, a gate insulating layer (not shown) disposed on the entire surface of the lower substrate including the gate electrode, an active layer 22 formed below the data line 23 on one portion of the gate line 21, a source electrode 23a projecting from the data line 23 and having first and second grooves, and first and second drain electrodes 23b and 23c formed in the first and second grooves at a predetermined interval from the source electrode 23a. In this case, the adjacent thin film transistors of the upper and lower pixel regions use the gate electrode, the source electrode 23a and the active layer 22 in common.

After that, a passivation layer (not shown) is formed on the thin film transistor, and a plurality of zigzag-patterned pixel electrodes 24 are formed on the passivation layer between the common electrodes 21b. The pixel electrode 24 is in contact with the first/second drain electrodes 23b and 23c. At this time, the liquid crystal positioned between the common electrode 21b and the pixel electrode 24 is aligned at the same direction by the electric field parallel to the substrates, thereby forming one domain. According to the method of the electric field parallel to the substrates, it is possible to fabricate a multi-domain LCD device having a plurality of domains within one pixel region, thereby obtaining a wide viewing angle.

The upper substrate is formed opposite to the lower substrate. The upper substrate includes a black matrix layer 31 that excludes light from regions except the pixel regions of the lower substrate, and R/G/B color filter layers (not shown) displaying various colors. At this time, the black matrix layer 31 overlaps with one portion of the common electrode 21b adjacent to the common line 21a and the gate line 21, and one portion of the outermost common electrode 21b adjacent to the data line 23.

In case of forming the black matrix layer 31, the border between the upper and lower opening regions is determined by the black matrix layer 31. Also, the border between the left and right opening regions is determined by the common electrode 21b adjacent to the data line 23. The upper/lower/left/right opening regions are determined with the black matrix layer 31 and the common electrode 21b, so that it has the problem such as changes of the opening regions according to the bonding margin of the upper and lower substrates.

Also, as the large-sized upper and lower substrates are formed with demands for large-sized LCD devices, the exposure process is carried out divisionally when forming a TFT array of the lower substrate. At this time, if a misalignment is generated between the regions by the exposure process, stitching spots generate on a screen. Accordingly, when carrying out the exposure process on the lower substrate, it is required to take the stitching margin into consideration. When forming the black matrix layer 31 on the upper substrate, it requires one exposure process.

However, even though it takes the bonding margin and the stitching margin into consideration when fabricating the related art LCD device, the upper/lower/left/right opening regions are changed in that the upper and lower opening regions of the large-sized upper and lower substrates are determined by the black matrix layer 31, and the left and right opening regions are determined by the common electrode 21b. Accordingly, the opening regions (opening areas) are different in the respective pixel regions, whereby a problem is created, such as non-uniformity of luminance on the entire LCD panel.

SUMMARY OF THE INVENTION

Accordingly, the present invention is directed to a liquid crystal display (LCD) device that substantially obviates one or more problems due to limitations and disadvantages of the related art.

An object of the present invention is to provide a liquid crystal display (LCD) device, which defines an open area of a lower substrate by a common electrode, thereby preventing stitching spots and changes of aperture ratio by the bonding process on a large-sized LCD panel.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a liquid crystal display (LCD) device includes first and second substrates facing each other at a predetermined interval therebetween; gate and data lines crossing each other on the first substrate to define a pixel region; a common line disposed in parallel to the gate line; a thin film transistor provided at the crossing portion of the gate and data lines; a plurality of common electrodes connected to the common line at fixed intervals in the same direction as the data line; a pixel electrode in contact with a drain electrode of the thin film transistor, between the common electrodes at fixed intervals; a black matrix layer disposed on the second substrate, inside the outermost-opening limiting line of the first substrate (below the bonding margin); and a color filter layer disposed on the second substrate.

At this time, the black matrix layer does not overlap with the common electrode, the outermost-opening limiting line of the first substrate.

The adjacent upper and lower pixel regions use the gate line in common, and the two thin film transistors of the adjacent upper and lower pixel regions use a gate electrode, a source electrode and an active layer in common.

The two thin film transistors of the adjacent upper and lower pixel regions include the gate electrode defined in one portion of the gate line; a gate insulating layer disposed on the entire surface of the first substrate including the gate electrode; an active layer formed below the data line on one portion of the gate line; a source electrode projecting from the data line and having first and second grooves of upper and lower directions; and first and second drain electrodes extending in the first and second grooves to the pixel regions at a predetermined interval from the source electrode.

The common electrode and the pixel electrode are formed as zigzag patterns and as straight lines, in parallel. Also, the common line and the common electrode are formed on the same layer as the gate line.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to a preferred embodiment of the present invention, examples of which are illustrated in the accompanying drawings. Wherever possible, the same reference numbers will be used throughout the drawings to refer to the same or like elements.

Hereinafter, an LCD device according to a preferred embodiment of the present invention will be described with reference to the accompanying drawings. The LCD device according to the preferred embodiment of the present invention defines respective open areas by common electrodes of a lower substrate.

FIRST EMBODIMENT

Figure 1:
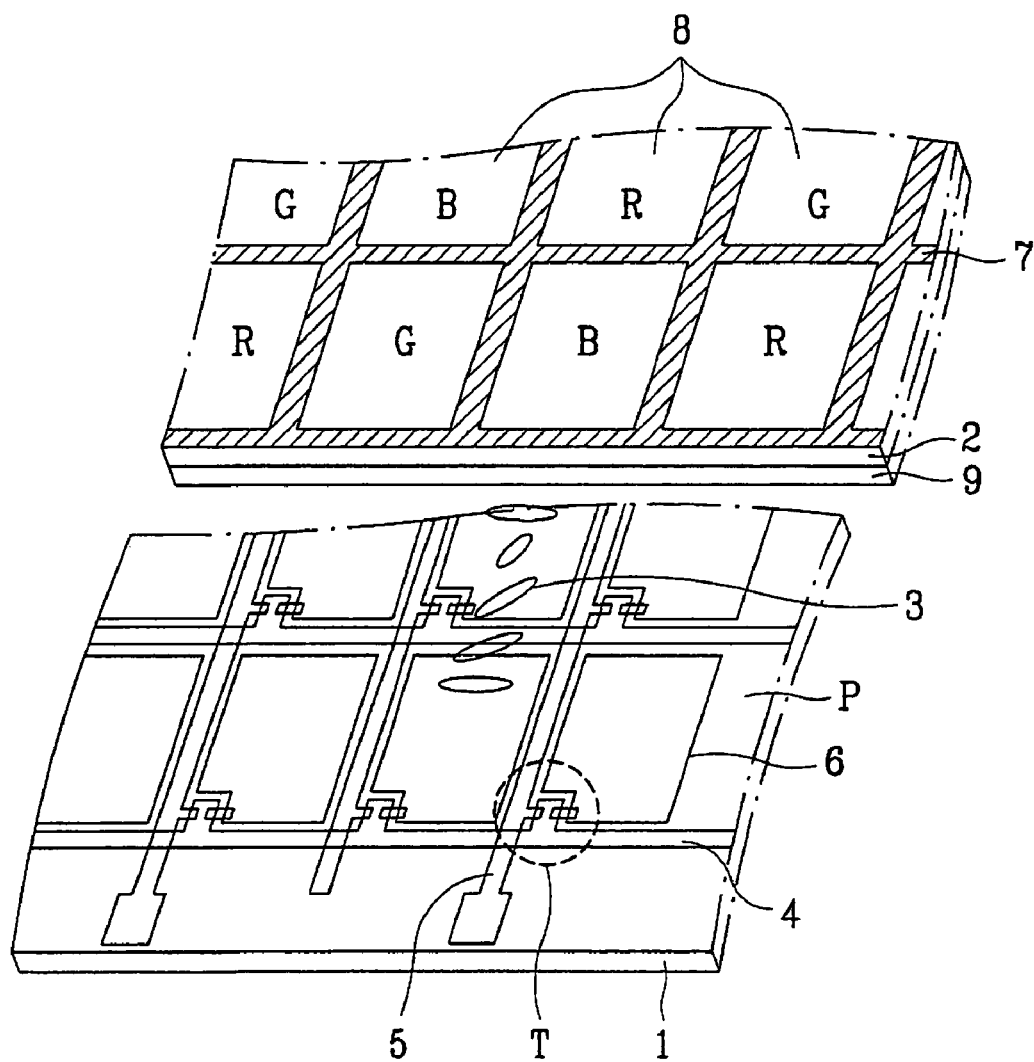
FIG. 1 is an exploded perspective view partially illustrating a general TN mode LCD device.
Figure 2:
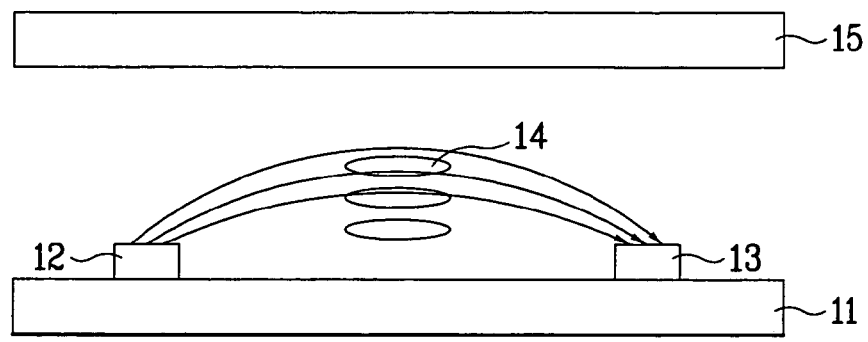
FIG. 2 is a cross-sectional view schematically illustrating a general IPS mode LCD device.
Figure 3A:
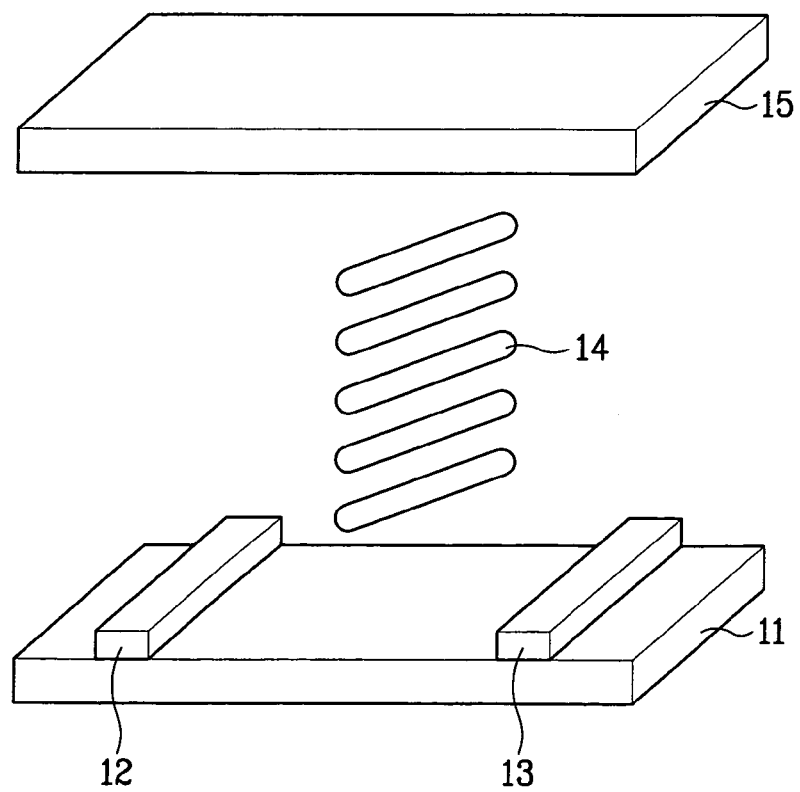
FIG. 3A and FIG. 3B illustrate the phase change of liquid crystals when turning on/off an IPS mode LCD device.
Figure 3B:
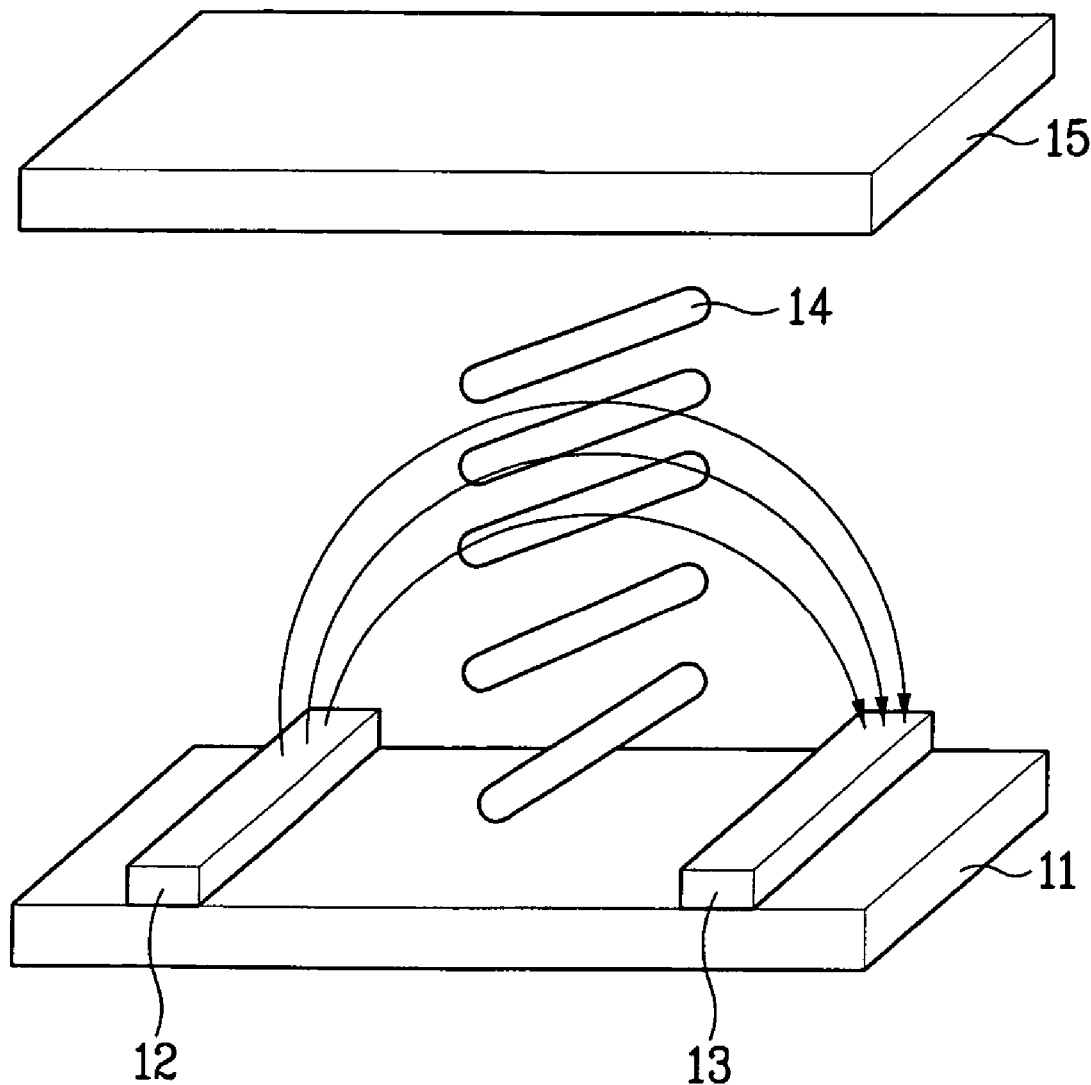
Figure 4A:
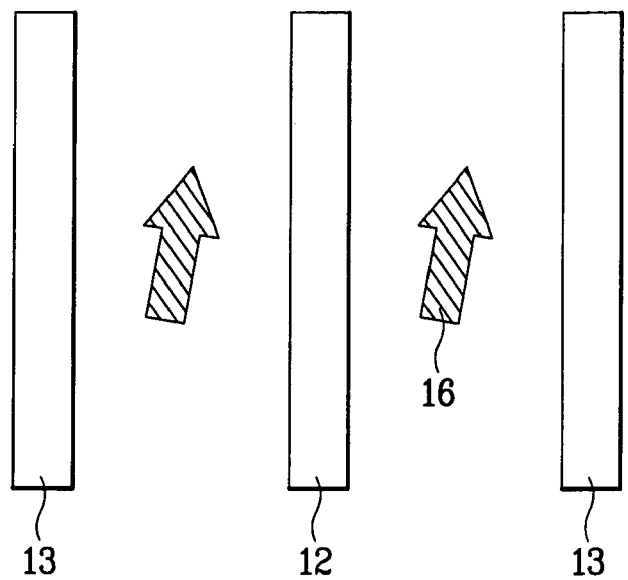
FIG. 4A and FIG. 4B are perspective views illustrating the operation of an IPS mode LCD device in the on/off state.
Figure 4B:
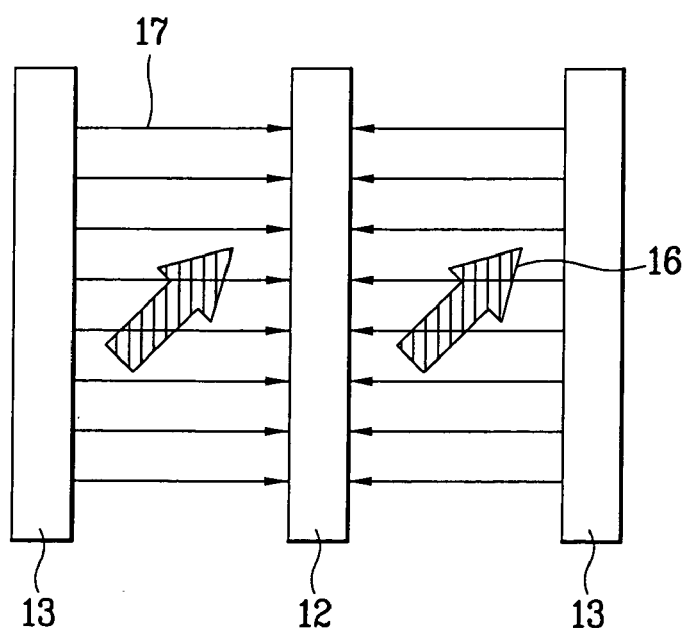
Figure 5:
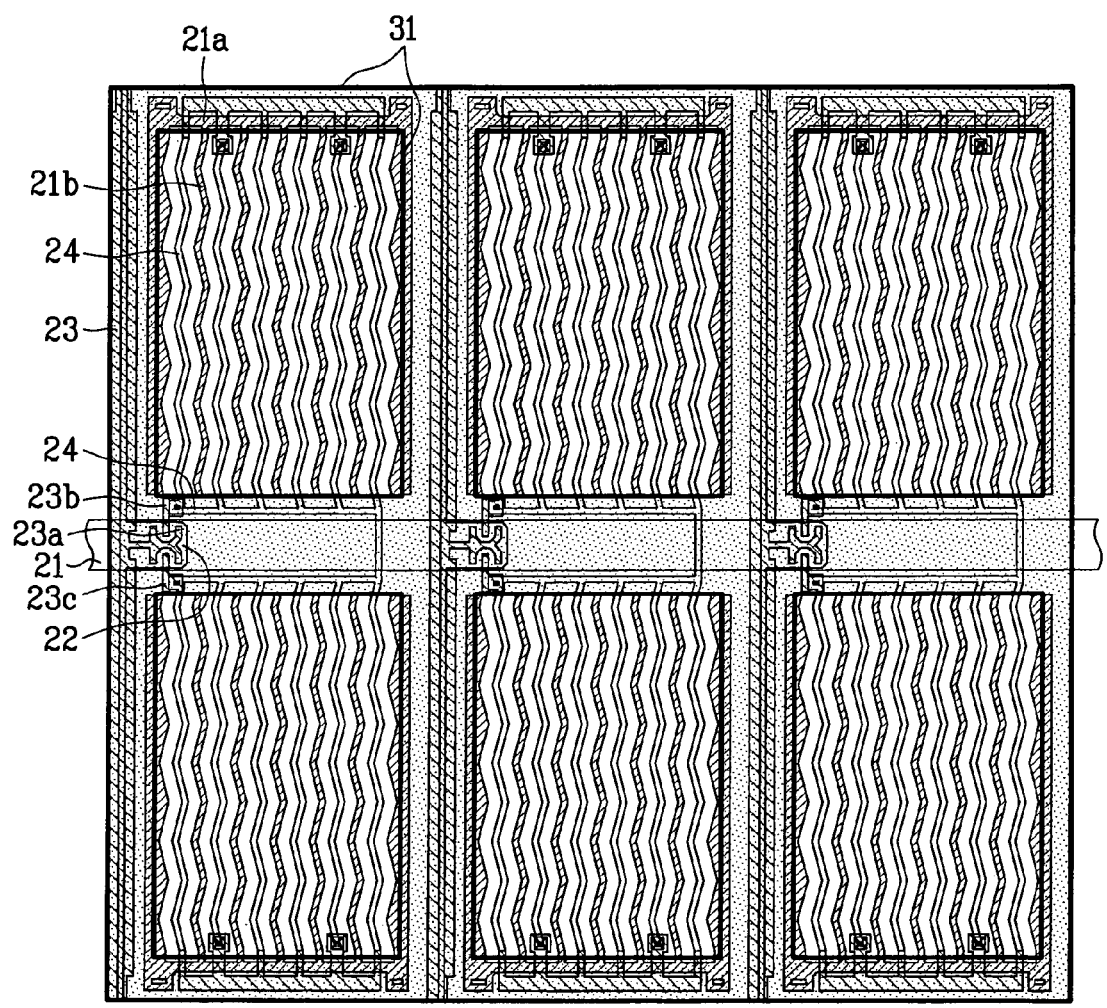
FIG. 5 is a plane view illustrating an IPS mode LCD device according to the related art.
Figure 6A:
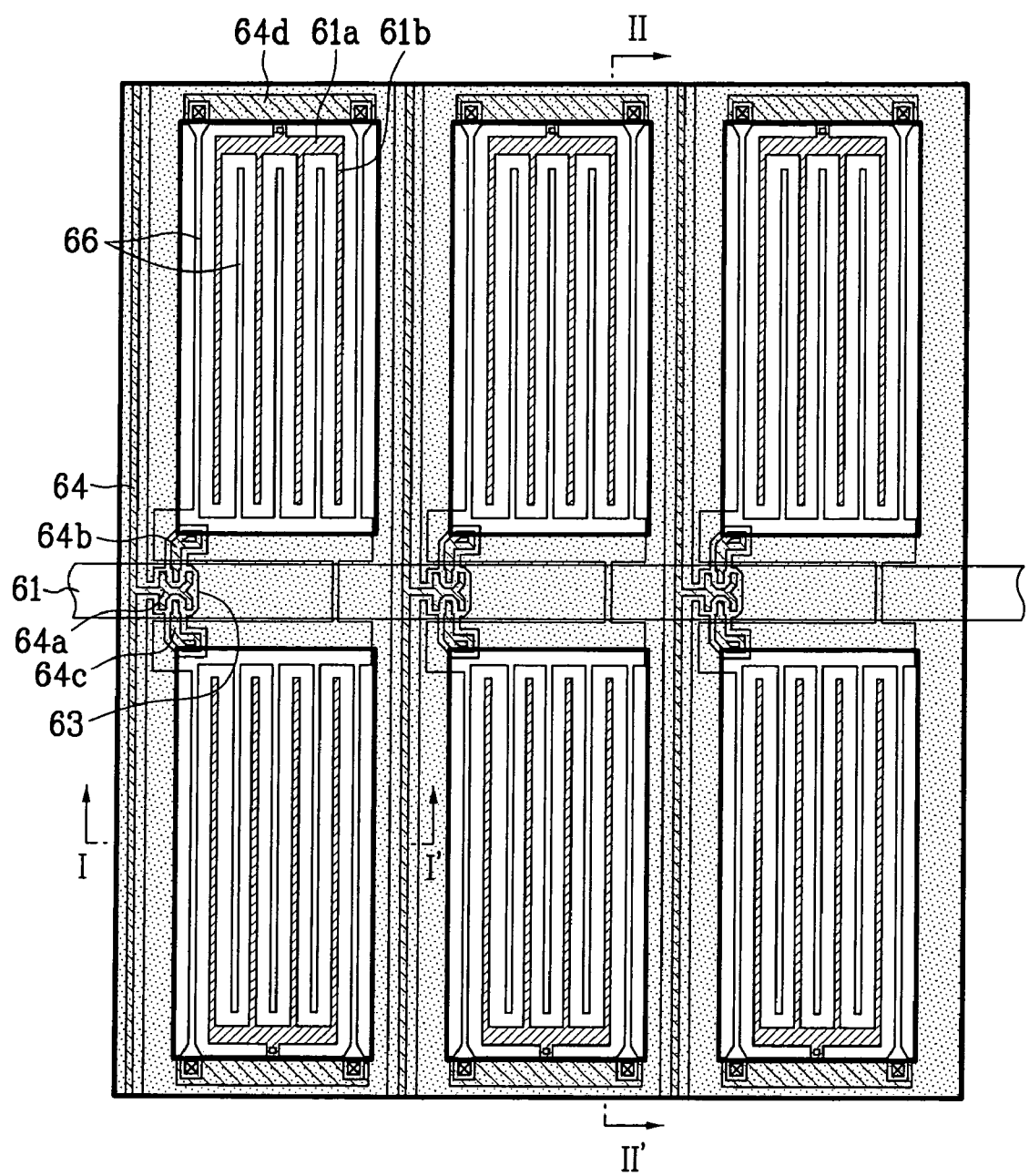
FIG. 6A is a plane view illustrating an LCD device according to the first embodiment of the present invention.
Figure 7:
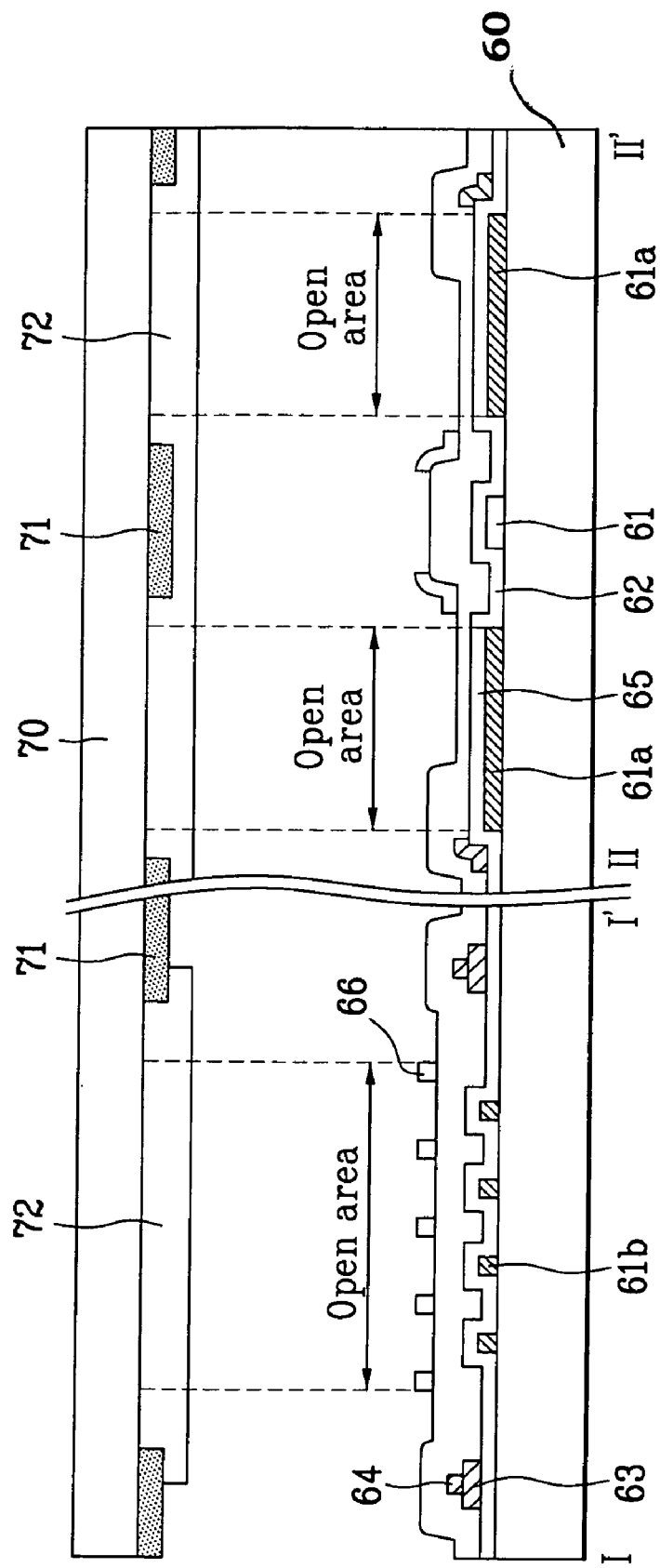
FIG. 7 is a cross-sectional view taken along lines I-I' and II-II' of FIG. 6A and FIG. 6B.

FIG. 6A is a plane view illustrating a LCD device according to the first embodiment of the present invention. FIG. 7 is a cross-sectional view taken along lines I-I' and II-II' of FIG. 6A.

As shown in FIG. 6A and FIG. 7, the LCD device according to the first embodiment of the present invention includes a plurality of gate lines 61 formed on a transparent lower substrate 60 in one direction at fixed intervals, and a plurality of data lines 64 formed in perpendicular to the gate lines 61 at fixed intervals to define a plurality of pixel regions. A common line 61a is formed in the pixel region in the same plane and parallel with the gate line 61, and a plurality of common electrodes 61b connected to the common line 61a are formed at fixed intervals in the same direction as the data line 64. At this time, the common electrode 61b is formed as a straight line.

Also, a plurality of thin film transistors are formed in the respective pixel regions defined by crossing the gate and data lines 61 and 64. At this time, the adjacent upper and lower pixel regions use the gate line 61 in common, and the two thin film transistors of the adjacent upper and lower pixel regions use a gate electrode, a source electrode 64a and an active layer 63 in common.

The two adjacent thin film transistors include the gate electrode defined in one portion of the gate line 61, a gate insulating layer 62 on an entire surface of the lower substrate including the gate electrode, the active layer 63 formed below the data line 64 on a predetermined portion of the gate line 61, a source electrode 64a projecting from the data line 64 and having first and second grooves at upper and lower sides, and first and second drain electrodes 64b and 64c formed in the first and second grooves at a predetermined interval from the source electrode 64a. Also, a storage electrode 64d is formed on the same layer as the data line 64, and is in contact with a pixel electrode 66. In this state, the active layer 63 is wider than the data line 64, the source electrode 64a, and the first/second drain electrodes 64b and 64c.

A passivation layer 65 is then formed on the thin film transistor, and each pixel electrode 66 is formed on the passivation layer 65 between the common electrodes 61b. The pixel electrode 66 is in contact with the first/second drain electrodes 64b/64c of the upper and lower sides. In this case, liquid crystal positioned between the common electrode 61b and the pixel electrode 66 is aligned in the same direction by an electric field parallel to the substrates, thereby forming one domain. According to the present system wherein the electric field is parallel to the substrates, it is possible to obtain multiple domains within one pixel region, thereby fabricating a multi-domain LCD device having a wide viewing angle.

An upper substrate 70 is formed opposite to the lower substrate 60. The upper substrate 70 includes a black matrix layer 71 that excludes light from regions except for the pixel regions of the lower substrate, and the R/G/B color filter layers 72 displaying various colors. The black matrix layer 71 is formed below the bonding margin to define open areas (upper/lower/left/right open areas) of the lower substrate 60 at the common electrode 61b. That is, the black matrix layer 71 does not overlap with the common electrodes 61b of the upper/lower/left/right directions, the outermost-opening limiting line of the lower substrate 60. Accordingly, the real open area is determined with the common electrode 61b of the lower substrate 60.

In the related art LCD device, the upper and lower opening areas of the large-sized upper and lower substrates are defined by the black matrix layer, and the left and right open areas are defined by the common electrode. In the LCD device according to the present invention, the open areas are determined only by the common electrode 61b, so that it is possible to prevent the problems such as changes in the open areas by the bonding margin of the upper and lower substrates and stitching spots on the border between exposure regions caused by misalignment. As a result, it is possible to prevent luminance difference by changing the opening areas.

SECOND EMBODIMENT

Figure 6B:
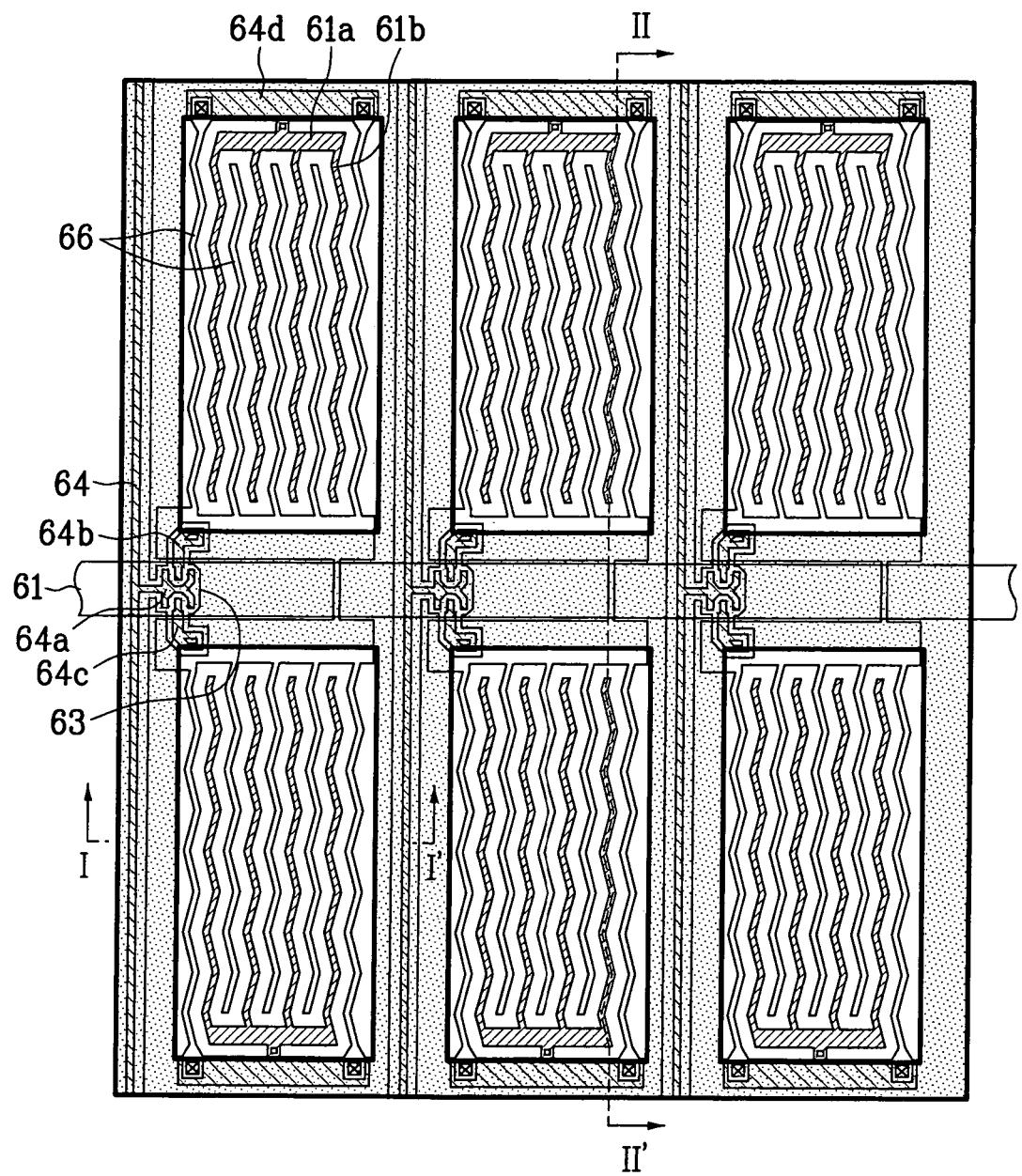
FIG. 6B is a plane view illustrating an LCD device according to the second embodiment of the present invention.

FIG. 6B is a plane view illustrating an LCD device according to the second embodiment of the present invention. FIG. 7 is a cross-sectional view taken along lines I-I' and II-II' of FIG. 6B.

As shown in FIG. 6B and FIG. 7, the LCD device according to the second embodiment of the present invention includes a common electrode 61b and pixel electrodes 66 formed as zigzag patterns. Except for this, the LCD device according to the second embodiment of the present invention has the same structure as that of the first embodiment of the present invention. Accordingly, the explanation of the second embodiment of the present invention will be omitted.

In the LCD device according to the second embodiment of the present invention, open areas are determined by the common electrode 61b of a lower substrate 60, thereby providing the same effect as the first embodiment of the present invention.

As mentioned above, the LCD device according to the preferred embodiments of the present invention has the following advantages. In the LCD device according to the preferred embodiments of the present invention, the open areas are determined with the common electrode of the lower substrate. As a result, it is possible to prevent the open areas from being different in the respective pixel regions. Also, the process margin for the stitching spots is obtained in the large-sized LCD panel, to cope with the stitching spots generated by the exposure process, thereby improving yield.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A liquid crystal display (LCD) device, comprising:
   first and second substrates facing each other at a predetermined interval therebetween;
   gate and data lines crossing each other on the first substrate to define a pixel region;
   a common line provided in parallel to the gate line;
   a thin film transistor provided at a crossing portion of the gate and data lines;
   a plurality of common electrodes connected to the common line at fixed intervals and disposed in the same direction as the data line;

a pixel electrode provided in contact with a drain electrode of the thin film transistor, between the common electrodes at fixed intervals;

a black matrix layer provided on the second substrate, inside an outermost-opening limiting line of the first substrate, below a bonding margin; and a color filter layer provided on the second substrate, wherein at least one gate line has an adjacent upper pixel region defined adjacent to an upper side of the gate line and an adjacent lower pixel region defined adjacent to a lower side of the gate line opposite the upper side of the gate line, wherein the adjacent upper and lower pixel regions use the gate line in common, and wherein the thin film transistors of the adjacent upper and lower pixel regions use a gate electrode, a source electrode and an active layer in common.

2. The LCD device of claim 1, wherein the black matrix layer does not overlap with the common electrode, the outermost-opening limiting line of the first substrate.

3. The LCD device of claim 1, wherein the thin film transistors of the adjacent upper and lower pixel regions include:

the gate electrode defined in one portion of the gate line;

a gate insulating layer disposed on an entire surface of the first substrate including the gate electrode;

the active layer formed below the data line on one portion of the gate line;

the source electrode projecting from the data line and having first and second grooves with upper and lower directions; and first and second drain electrodes extending in the first and second grooves to the pixel regions at a predetermined interval from the source electrode.

4. The LCD device of claim 1, wherein the common electrode and the pixel electrode are formed with a zigzag configuration.

5. The LCD device of claim 1, wherein the common electrode and the pixel electrode are formed with a straight line configuration.

6. The LCD device of claim 1, wherein the common line and the common electrode are formed on a same layer as the gate line.

7. A method of producing a liquid crystal display (LCD) device, comprising:

forming a plurality of gate lines on a first substrate in a first direction;

forming a plurality of data lines on the first substrate in a second direction substantially perpendicular to the first direction to define a plurality of pixel regions;

forming a thin film transistor for each pixel region at a crossing portion of the gate and data lines that define the particular pixel region;

forming a common line on the first substrate in each pixel region, wherein the common line is oriented substantially parallel to the first direction;

forming a plurality of common electrodes for each pixel region, wherein the plurality of common electrodes for the pixel region are electrically connected with the corresponding common line and wherein the plurality of common electrodes extend substantially in the second direction;

forming a pixel electrode for each pixel region, wherein the pixel electrode is electrically connected to a drain electrode of the corresponding thin film transistor and wherein the pixel electrodes extends substantially in the second direction in between adjacent common electrodes of the corresponding pixel region;

forming a black matrix layer on a second substrate;

forming a plurality of color filters on the second substrate, wherein each color filter corresponds to a particular pixel region formed on the first substrate; and attaching the first substrate to the second substrate with a predetermined interval therebetween, wherein the black matrix layer is formed to be inside an outermost-opening limiting line of the first substrate, below a bonding margin, wherein the step of forming the plurality of gate lines comprises forming the gate lines such that at least one gate line has an adjacent upper pixel region defined adjacent to an upper side of the gate line and an adjacent lower pixel region defined adjacent to a lower side of the gate line opposite the upper side of the gate line and the adjacent upper and lower pixel regions use the gate line in common, and wherein the step of forming the plurality of thin film transistors is performed such that the adjacent upper and lower pixel regions use a common gate electrode a common source electrode and a common active layer.

8. The method of producing the LCD device of claim 7, wherein the step of forming the black matrix layer comprises forming the black matrix layer without overlapping with the common electrode, the outermost-opening limiting line of the first substrate.

9. The method of producing the LCD device of claim 7, wherein the step of forming the thin film transistors comprises:

defining the gate electrode in one portion of the gate line;

disposing a gate insulating layer on an entire surface of the first substrate including the gate electrode;

forming the active layer below the data line on the one portion of the gate line;

projecting the source electrode from the data line and with first and second grooves with upper and lower directions, respectively; and forming first and second drain electrodes extending in the first and second grooves to the adjacent upper and lower pixel regions at a predetermined interval from the source electrode.

10. The method of producing the LCD device of claim 7, wherein the step of forming the plurality of common electrodes for each pixel region comprises forming the common electrodes in a zigzag configuration; and wherein the step of forming the pixel electrode for each pixel region comprises forming the pixel electrode with the zigzag configuration.

11. The method of producing the LCD device of claim 7, wherein the step of forming the plurality of common electrodes for each pixel region comprises forming the common electrodes in a straight line configuration; and wherein the step of forming the pixel electrode for each pixel region comprises forming the pixel electrode with the straight line configuration.

12. The method of producing the LCD device of claim 7, wherein the steps of forming the common line and the plurality of common electrodes for each pixel region comprises forming the common line and the plurality of common electrodes on a same layer as the gate line.

13. A liquid crystal display (LCD) device, comprising:

a light filter array, wherein the light filter array comprises:

a plurality of light transmission filters formed on a light filter array substrate, wherein each light transmission filter corresponds to a particular pixel region of a plurality of pixel regions defined on a transistor array; and a black matrix layer formed on the light filter array substrate and arranged to be in between adjacent light transmission filters, wherein the black matrix layer is formed not to overlap with an open area of at least one pixel region, and wherein the open area of the at least one pixel region is space occupied by a common line, a plurality of common electrodes extending from the common line, and a pixel electrode of the at least one pixel region formed on a transistor array substrate of the transistor array, wherein the transistor array further comprises:
- a plurality of gate lines on the transistor array substrate in a first direction;
- a plurality of data lines on the transistor array substrate in a second direction substantially perpendicular to the first direction to define the plurality of pixel regions;
- a thin film transistor for each pixel region at a crossing portion of the gate and data lines that define the particular pixel region;
- the common line on the first substrate in each pixel region, wherein the common line is oriented substantially parallel to the first direction;
- the plurality of common electrodes for each pixel region, wherein the plurality of common electrodes for the pixel region are electrically connected with the corresponding common line and wherein the plurality of common electrodes extend substantially in the second direction; and the pixel electrode for each pixel region, wherein the pixel electrode is electrically connected to a drain electrode of the corresponding thin film transistor and wherein the pixel electrodes extends substantially in the second direction in between adjacent common electrodes of the corresponding pixel region, wherein at least one gate line has an adjacent upper pixel region defined adjacent to an upper side of the gate line and an adjacent lower pixel region defined adjacent to a lower side of the gate line opposite the upper side of the gate line, wherein the adjacent upper and lower pixel regions use the gate line in common, and wherein the thin film transistors of the adjacent upper and lower pixel regions use a common gate electrode, a common source electrode and a common active layer.

14. The liquid crystal display (LCD) device of claim 13, wherein the black matrix layer is formed to not overlap with open areas of all pixel regions.

15. The liquid crystal display (LCD) device of claim 13, wherein the plurality of light transmission filters are a plurality of color filters.

16. The liquid crystal display (LCD) device of claim 13, wherein the plurality of common electrodes and the pixel electrode for each region are in a straight line configuration or a zigzag configuration.

* * * * *